United States Patent [19]

Tipton

[11] Patent Number: 4,462,392

[45] Date of Patent: Jul. 31, 1984

[54] FIXED SOLAR COLLECTION SYSTEM

[76] Inventor: Harry R. Tipton, 4700 E. Main, Space 625, Mesa, Ariz. 85205

[21] Appl. No.: 507,238

[22] Filed: Jun. 23, 1983

[51] Int. Cl.³ .............................................. F24J 3/02
[52] U.S. Cl. ................................ 126/439; 350/167; 350/294; 126/440
[58] Field of Search .................. 126/439, 440, 441; 362/328, 346, 347, 350; 350/259–262, 264, 293, 294, 167

[56] References Cited

U.S. PATENT DOCUMENTS

| 294,117 | 2/1884 | Calver | 126/439 |
|---|---|---|---|
| 1,596,161 | 8/1926 | Dorey | 362/328 X |
| 2,068,246 | 1/1937 | Rolph | 362/328 |

FOREIGN PATENT DOCUMENTS 18998 of 1913 United Kingdom ................ 126/440

Primary Examiner—Randall L. Green
Attorney, Agent, or Firm—Richard R. Mybeck

[57] ABSTRACT

A fixed solar energy collector system having facing panels of different size forming a Vee-shaped trough open at its base and supporting a plurality of highly reflective convex reflectors strategically disposed upon said panels in reflective relationship to a plurality of Fresnel lenses positioned at the base of the trough. A suitable reflector, disposed beneath the Fresnel lenses, directs the reflected energy to a heat-needy target.

19 Claims, 3 Drawing Figures

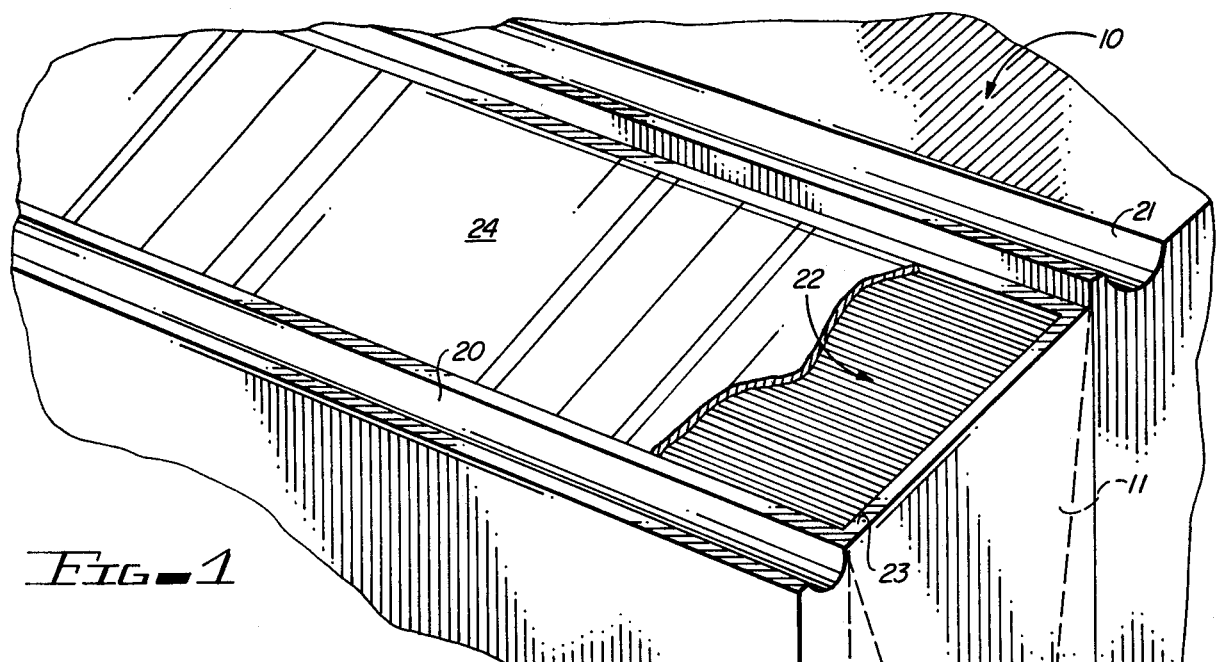
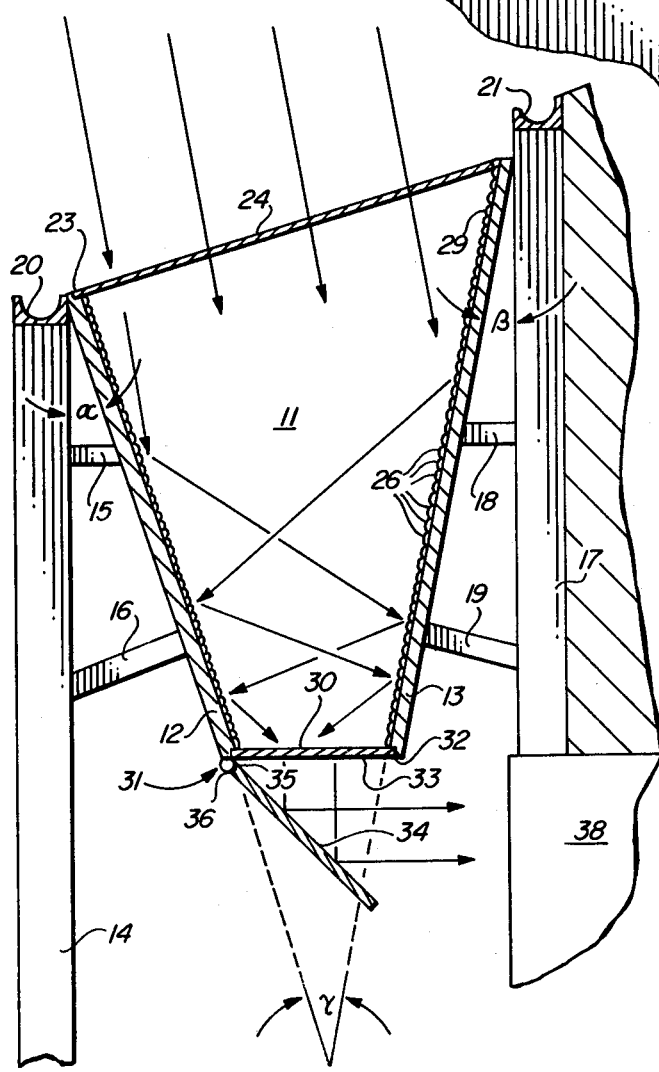
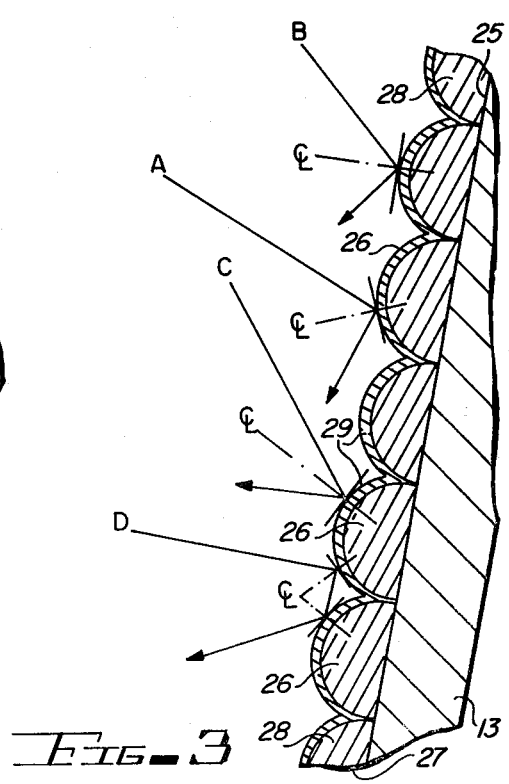
Fig-1
Fig-2
Fig-3

FIXED SOLAR COLLECTION SYSTEM

INTRODUCTION

This invention relates generally to energy conservation and more particularly to means for receiving, collecting and utilizing solar energy.

BACKGROUND OF THE INVENTION

In U.S. Pat. Nos. 3,923,381; 3,957,031 and 4,002,499, examples are shown of a particular type of radiant energy concentration and collection device which is generally known as a "trough-shaped non-imaging collector". Such devices take radiant energy which strikes an entrance aperture and concentrate it onto an exit aperture having an area which is smaller than that of the entrance aperture. Reflective side walls of particular contour extend between the entrance aperture and the exit surface. An energy absorber is generally positioned adjacent the exit aperture.

The prior art methods of constructing a trough-shaped collector include the use of extruded aluminum side walls, aluminum sheet rolled into proper contour, or thick metalized solid plastic substrates. Each of these methods were characterized either by their high cost of manufacture or their extreme weight.

U.S. Pat. No. 4,099,515 attempted to overcome some of the prior art problems by utilizing a one-piece thin walled plastic substrate having wall portions corresponding to the ideal contour desired for such a trough-shaped collector. This device, as did its predecessor designs, required the use of concave reflector members.

A further problem existing in the design of several prior art devices arises from their inability to readily adjust the angle of reception to accomodate solar migration, that is, the relative movement between the sun and the earth created by seasonal variations. Thus, each of these devices required additional energy consuming means to tilt the collector and track the movement of the sun in an attempt to overcome the angular inefficiencies created by solar migration. These devices were generally predicated upon the premise that the 23.5 degree inclination of the equator required a collecting system to tilt in a north-south plane through an angle of 47 degrees in order to accomodate the seasonal change and thereby operate efficiently.

In addition, the traditional bias toward the utilization of concave reflectors is challenged herein by a design which employs a myriad of convex reflectors strategically disposed upon a uniquely designed elongated trough to maximize the collection and hence the concentration of the solar energy received therewithin.

SUMMARY OF THE INVENTION

An elongated trough formed of facing panels in a Vee configuration and open at its base is adapted for receiving solar energy upon a plurality of highly reflective convex receptors strategically located upon the panels in a reflective relationship to a plurality of Fresnel lenses disposed at the base of the panels. A suitable reflector, disposed beneath the Fresnel lenses, directs the reflected energy to the preselected target as will be hereinafter described in more detail.

The relationship of the facing panels to each other and the angle defined thereby enables solar migration to occur vis-a-vis the earth's surface, without the addition of auxilliary energy consuming means to tilt the panels.

The convex reflector of the present invention is especially efficient when it is provided with the unique curvature defined hereby which is formed by an arc having a chord equal to three fourths the diameter of the circle from which it is formed.

OBJECTS OF INVENTION

The prime object of the present invention is to provide a new and improved means for collecting energy released by the sun and utilizing it to augment currently available energy sources in a simple and cost efficient manner.

Another object of the present invention is to provide a solar energy collection system which is effective in its as-built conditon to maximize the collection of available solar energy without the need for auxilliary energy consuming tracking equipment.

A further object of the present invention is to provide a novel and unique reflective receptor capable of receiving and reflecting a solar energy wave irrespective of the angle of incidence at which it is received.

These and still further objects as shall hereinafter appear are fulfilled by the present invention in a remarkably unexpected fashion as can be readily discerned from the following detailed description of exemplary embodiments thereof especially when read in conjunction with the accompanying drawing in which like parts bear like indicia throughout the several views.

THE DRAWING

In the drawing:

FIG. 1 is a three-quarter elevation, partially broken away, of a solar energy collection system embodying the present invention;

FIG. 2 is an end elevation, partially in section, of the solar energy collection system shown in FIG. 2; and FIG. 3 is an enlarged segment showing convex receptors embodying the present invention.

DETAILED DESCRIPTION

Referring to the drawing, the energy collection system 10 of the present invention comprises generally Vee-shaped trough 11 defined by a first panel 12 and a second panel 13 angularly disposed relative to each other in a manner to be hereinafter described in detail.

Each panel, for example panel 12, is mounted upon exterior support girders 14 having intermediate support members 15, 16, operatively interposed between girders 14 and panel 12. Similarly, panel 13 is mounted upon exterior support girders 17 having intermediate support members 18, 19 operatively interposed between girders 17 and panel 13. A suitable rain gutter 20, 21 is respectively defined atop each support girder 14, 17.

Disposed between panels 12, 13 adjacent 14, 17 is collector cover 22 having a rectangular frame 23 into which is secured a pane 24 of suitable transparent material, such as nylon, glass and the like, which permits solar energy to pass therethrough unimpaired while keeping dust and other air-borne particulate matter from settling into the trough 11 and soiling panels 12, 13.

Panels 12 and 13 are disposed in such a manner that the panel proximal to the sun's path, e.g., panel 12, is approximately 10% shorter than panel 13 which is distal to the sun's path. Panels 12, 13 are positioned in a spaced angular relationship to each other so that the interior angle defined by the intersecting planar projections thereof equals the sum of the interior angles defined between the upper edge of each panel and the girder adjacent thereto when the girders are positioned in a true perpendicular to the earth's surface, that is, $<\gamma = <\alpha + <\beta$.

In the Northern Hemisphere, the panel distal to the sun's path, that is panel 13, is disposed at an angle equal to the angle of incidence between the sun's rays and the earth relative to the latitude in which the collector is located at the winter equinox plus 5°–15° whereas the panel proximal to the sun's path, that is, panel 12, is disposed an angle equal to the angle of incidence between the sun's rays and the earth relative to the latitude in which the collector is located on the summer equinox plus 5°–15°. Of course, in the Southern Hemisphere, the positioning of the panels relative to the equator will be reversed.

Referring to FIG. 3, the panel-facing-surface of each panel, for example surface 25 of panel 13, covered with a plurality of highly reflective convex receptors 26 preferably produced in a series of parallel strips 27.

Each receptor 26 is like every other receptor disposed on the respective panels 12, 13 and, in its preferred form, will have a convex curvature formed by an arc having a chord approximately equal to three-fourths of the diameter of the circle from which it is formed.

In one practice of the present invention each receptor 26 in each strip 27 is formed with a body 28 of extruded aluminum over which a highly reflective plastic film 29 such as nylon, mylar and the like is disposed.

Because the energy collection system 10 of the present invention is placed in a fixed position relative to the earth's surface at the time it is constructed with panels 12, 13 oriented along an east-west line, each receptor 26 is able to receive a solar wave as shown by lines A, B, C and D in FIG. 3, either directly or diffused from the sun or by reflection from a receptor mouned on the same or the opposing panel. Each receptor 26 reflects the wave immediately therefrom toward another receptor 26 disposed either on the same or on the facing panel or toward the exit aperture in accordance with the basic relationship that the angle of reflection will equal the angle of incidence.

The intensification resulting from the reflective action of several receptors 26, upon the solar waves ultimately directs the reflected energy to the exit aperture 30, defined by the lower edges 31, 32 of panels 12, 13 respectively through a plurality of Fresnel lenses 33 formed in a rectangular shape and disposed end to end along the entire length of the aperture 30.

A relatively large heat reflective mirror 34 is disposed beneath aperture 30 to receive the energy passing through lens 33 and reflects the energy received thereupon toward a preselected target 38 located in operative association therewith as will be hereinafter described.

Mirror 34 is supported at its upper edge 35 by a swivel-like attachment 36 having universal movement in that it permits mirror 34 to be adjusted both vertically and horizontally whereupon the angle of reflected energy deflected therefrom can be adjusted by varying the angle of incidence by which mirror 34 receives energy waves from exit aperture 30. By turning mirror 34 in universal swivel 36 the intensity of the energy reflected by mirror 34 and the area of the target 38 covered by the reflected heat can be readily controlled.

The target 38 upon which the mirror 34 reflects the energy it receives from trough 11, when operating in the manner described, can be a boiler or other device capable of storing or utilizing high temperature fluids. Fluids such as water can be converted into the steam within a closed system and the steam utilized to drive a turbine in the conventional manner, or the steam can be raised to condensers and placed in a reservoir for stored hydro electric power, or the heat can be used to create various chemicals which, when later reacted, will liberate energy at whatever location and for whatever purpose would be appropriate at the time. For purposes herein, such targets will be referred to as "heat-needy appliances".

In any event, the target 38 will be disposed within the containment defined by side walls 14, 17, end wall 37 and the opposite end wall (not shown) because, as is apparent, a tremendous amount of heat energy is concentrated within the system and basic safety requires that no human or animal life be permitted to enter therein.

One of the desirable aspects of the present invention, as herein described and illustrated is the ability to upscale or down scale the overall design of the system to meet the specific energy need of the area in which it is to be installed. Thus where the need is great, a series of panels, each of which can be as long as three hundred feed, can be constructed using concrete walls, girders and cable supension to avoid interference with the reflected waves without departing from the invention. Thus a system is herein presented which achieves efficient collection and concentration in a fixed structure utilizing unique convex receptors to accept and intensify the energy which radiates from the sun.

From the foregoing it becomes readily apparent that the energy collection system herein described and illustrated fulfills all of the aforestated objectives in a remarkably unexpected fashion. It is of course understood that such modifications, alterations and adaptations as will readily occur to the artisan confronted with this disclosure are intended within the spirit of the present invention which is limited only by the scope of the claims appended hereto.

What is claimed is:

1. A solar energy collection system for receiving energy from the sun and directing it to a heat-needy appliance, said system comprising: a fixed base; a first and second panel secured to said base and disposed in angular spaced relationship to each other to define an entrance aperture and a exit aperture therebetween; a lens disposed in said exit aperture; a plurality of convex reflectors disposed upon each of said panels for receiving radiant solar energy thereupon and coacting with each other to reflect an effective amount thereof to and through said exit aperture and said lens; and adjustable reflection means disposed in operative spaced relationship to said exit aperture to receive the energy passed through said aperture and said lens and deliver said energy to said heat-needy appliance.

2. A system according to claim 1 in which said exit aperture has a plurality of Fresnel lenses disposed therein and extending for the length thereof.

3. A system according to claim 2 in which said entrance aperture is enclosed with a transparent cover.

4. A system according to claim 2 in which said reflectors are disposed in a plurality of elongated strips, said strips on each of said panels being mounted in abutting relationship to the strips contiguous thereto and in parallel relationship to every other strip on said panel.

5. A system according to claim 1 in which the panel proximal to the sun's path has a height which is approximately 90% of the panel which is distal to the sun's path.

6. A system according to claim 5 in which said proximal panel is disposed at an angle relative to the earth's surface equal to the angle of incidence of the sun's rays at the site of the base on the winter equinox plus 5°14 15° degrees.

7. A system according to claim 5 in which said distal panel is disposed at an angle relative to the earth's surface equal to the angle of incidence of the sun's rays at the site of the base on the summer equinox plus 5°14 15° degrees.

8. A system according to claim 1 in which said reflectors are disposed in a plurality of elongated strips, said strips on each panel being mounted in abutting relationship to the strips contiguous thereto and in parallel relationship to every other strip on said panel.

9. A system according to claim 8 in which said exit aperture has a plurality of Fresnel lenses disposed therein and extending for the length thereof.

10. A solar energy collector system according to claim 1 in which the curvature of each of said convex reflectors is formed by an arc having a chord approximately equal to ¾ of the diameter of the circle from which it is formed.

11. A convex reflector according to claim 10 in which each of said reflectors has a curvilinear aluminum body portion and a highly reflective film coated thereupon.

12. A solar energy collector system for receiving solar energy, and directing said energy to a heat-needy appliance comprising a Vee-shaped trough, Fresnel lenses disposed across the bottom of said trough, and a plurality of convex receptors disposed on each of the opposing internal surfaces of said trough coacting therewith to reflect an effective amount of the solar energy received thereupon through said Fresnel lenses, and adjustable reflective means disposed beneath said trough to receive said energy from said lenses and direct said energy to said heat-needy appliance.

13. A system according to claim 12 in which said entrance aperture is enclosed with a transparent cover.

14. A system according to claim 12 in which said reflectors are disposed in a plurality of elongated strips, said strips on each panel being mounted in abutting relationship to the strips contiguous thereto and in parallel relationship to every other strip on said panel.

15. A solar energy collector system according to claim 12 in which the curvature of each of said convex reflectors is formed by an arc having a chord approximtely equal to 182 of the diameter of the circle from which it is formed.

16. A convex reflector according to claim 12 in which each of said reflectors has a curvilinear aluminum body portion and a highly reflective film coated thereupon.

17. A system according to claim 12 in which the panel proximal to the sun's path has a height which is approximately 90% of the panel which is distal to the sun's path.

18. A system according to claim 17 in which said proximal panel is disposed at an angle relative to the earth's surface equal to the angle of incidence of the sun's ray at the site of the base on the winter equinox plus 5°–15° degrees.

19. A system according to claim 17 in which said distal panel is disposed at an angle relative to the earth's surface equal to the angle of incidence of the sun's rays at the site of the base on the summer equinox plus 5°–15° degrees.

* * * * *